(12) United States Patent
Harinarayan et al.

(10) Patent No.: US 8,122,360 B2
(45) Date of Patent: Feb. 21, 2012

(54) AUTOMATIC SELECTION OF USER-ORIENTED WEB CONTENT

(75) Inventors: Venkatesh Harinarayan, Saratoga, CA (US); Jason Zien, Mountain View, CA (US)

(73) Assignee: Kosmix Corporation, Mountain View, CA (US)

( * ) Notice: Subject to any disclaimer, the term of this patent is extended or adjusted under 35 U.S.C. 154(b) by 743 days.

(21) Appl. No.: 11/837,554

(22) Filed: Aug. 13, 2007

(65) Prior Publication Data

US 2009/0006974 A1 Jan. 1, 2009

Related U.S. Application Data

(60) Provisional application No. 60/946,698, filed on Jun. 27, 2007.

(51) Int. Cl.
*G06F 3/00* (2006.01)
*G06F 3/048* (2006.01)

(52) U.S. Cl. ........ 715/738; 715/739; 715/762; 715/779; 715/826

(58) Field of Classification Search .................. 715/779, 715/826, 762, 739
See application file for complete search history.

(56) References Cited

U.S. PATENT DOCUMENTS

| | | | | |
|---|---|---|---|---|
| 6,539,375 B2 * | 3/2003 | Kawasaki | | 1/1 |
| 6,853,982 B2 * | 2/2005 | Smith et al. | | 705/27 |
| 6,959,319 B1 * | 10/2005 | Huang et al. | | 709/203 |
| 7,310,612 B2 * | 12/2007 | McQueen et al. | | 705/26.61 |
| 7,565,425 B2 * | 7/2009 | Van Vleet et al. | | 709/224 |
| 7,702,635 B2 * | 4/2010 | Horvitz et al. | | 709/203 |
| 2002/0063735 A1 * | 5/2002 | Tamir et al. | | 345/745 |
| 2002/0070963 A1 * | 6/2002 | Odero et al. | | 345/739 |
| 2003/0140120 A1 * | 7/2003 | Hartman | | 709/219 |
| 2005/0033803 A1 * | 2/2005 | Vleet et al. | | 709/203 |
| 2005/0267973 A1 * | 12/2005 | Carlson et al. | | 709/228 |
| 2006/0004705 A1 * | 1/2006 | Horvitz et al. | | 707/2 |
| 2007/0156809 A1 | 7/2007 | Dickinson et al. | | |
| 2007/0168342 A1 * | 7/2007 | Singerman et al. | | 707/5 |
| 2007/0265905 A1 * | 11/2007 | Lazier | | 705/10 |
| 2008/0097864 A1 * | 4/2008 | Patel et al. | | 705/26 |
| 2009/0006371 A1 * | 1/2009 | Denoue et al. | | 707/5 |

OTHER PUBLICATIONS

Zhu Tingshao, An Effective Complete-Web Recommender System, May 2003.*
Galli Marcio, The DevEdge RSS-News Ticker Toolbar, Jul. 14, 2003.*
Horvitz Eric, Web Montage: A Dynamic Personalized Start Page, May 2002.*
Brenna Lars, Automatic Subscriptions in Publish-Subscribe System, Jul. 2006.*
"Google Alerts", http://www.google.com/alerts.
"Google Alerts: FAQ", http://www.google.com/alerts/faq.html?hl=en.
"Findory", http://www.findory.com.
"Findory: Help", http://www.findory.com/help.
"Findory: Help >> Findory Personalization Technology", http://www.findory.com/help/personalization.

* cited by examiner

*Primary Examiner* — Tadeese Hailu
*Assistant Examiner* — Nicholas Ulrich
(74) *Attorney, Agent, or Firm* — Peter M. Ullman LLC

(57) ABSTRACT

A toolbar is provided, which may be downloaded and installed in a user's web browser. The toolbar uploads the user's browsing history to a server. The server determines, based on the browsing history, which sites the user visits frequently. Additionally, the server determines, based on an analysis of web content, which categories of content, and which concepts, the user is interested in based on the concepts and categories that occur frequently in the user's browsing patterns. The server identifies content of interest to the user—where such content may comprise frequently-updated content, such as news or RSS feeds—and provides a custom web page that shows or identifies the selected content.

27 Claims, 11 Drawing Sheets

AUTOMATIC SELECTION OF USER-ORIENTED WEB CONTENT

CROSS-REFERENCE TO RELATED CASES

This application claims the benefit of U.S. Provisional Patent Application No. 60/946,698, entitled "Customizable web feed service," filed on Jun. 27, 2007.

BACKGROUND

Web content is most commonly found by a user-specified query. The user enters a query, in the form of a search string, into a search engine such as Google, Ask, etc., and a list of content items is returned. Certain search engines are focused on certain types of content. For example, the main search pages of Google and Ask focus on finding web pages, although most general-purpose search engines, including Google and Ask, have specialized search pages that focus on finding news, images, videos or movies, local information, etc.

Content that can be found by this method traditionally takes forms such as HyperText Markup Language (HTML), Portable Document Format (PDF), and others, although newer formats such as RSS (which, at various times, has stood for "Really Simple Syndication," "Rich Site Summary," and other phrases) have become popular in recent times. RSS is often used to deliver content that changes frequently. News site and weblogs ("bogs") are examples of content that changes frequently, and for which RSS is well-suited. Many web sites that are devoted to changing content, such as those of the major news services (e.g., the New York Times, CNN, etc.), or news services with a special focus (e.g., Valleywag, TechCrunch, etc.), provide RSS feeds on their sites. These RSS feeds may provide content that is updated recurrently to reflect recent events. The web sites of bloggers, such as those who cover politics, also may post RSS feeds on their site that are recurrently updated with new content.

When a user browses the web, a record of the user's browsing is created in the form of a search history. Browsers, such as Microsoft IE and Firefox, maintain a history of sites that the user has visited. The browsing history typically records web sites that have been visited for some number of weeks in the past (e.g., the last three weeks of browsing). This record may reflect the user's browsing behavior, tastes, interests, preferences, etc. (as well as some web sites that have been visited accidentally).

Various applications may attempt to discover a user's interests, tastes, etc., for various purposes. For example, web advertisement generators may use technologies such as cookies to track user behavior and to target ads to the user based on assumptions about this behavior. Advertisement generators also direct targeted advertising to a user based on the web site that is currently being visited—e.g., if a user visits a weather web site in the winter, the advertising service may generate an advertisement for coats on the web page. Certain search engines scan e-mail for keywords, and direct advertising to the user based on the user's interest as indicated by the content of their e-mail conversations.

However, the foregoing services generally do not use the user's browsing history to select content that is appropriate for the user. Nor do these web sites use the browse history, or other mechanism, to identify categories of recurrently-changing content that may interest the user.

SUMMARY

A tool can be provided for the user to download, which assists in providing content based on the user's browsing behavior. The tool can take the form of a toolbar, plug-in, extension, or add-on to be installed in a browser, an ActiveX control, a stand-alone application, etc. When the user downloads and installs the tool, the tool uploads the user's browsing history to a server. The tool may request the user's permission to upload the browsing history, or may otherwise notify the user that the browsing history is being uploaded. The server analyzes the user's browsing history, and identifies concepts and categories that appear to be of interest to the user, based on the Uniform Resource Locators (URLs) and titles that the user has visited. The server, or an entity that operates the server, may perform an analysis of various web content to determine the categories and concepts to which particular web content relate, and may use this information, combined with the user's actual browsing history, to identify what categories and concepts of interest appear to be of interest to the user. The server may analyze web content before receiving a particular user's browsing history, so that the analysis of existing web content can be ready to help identify the user's categories and concepts of interest when a user starts using the tool and provides his or her browsing history. The server may store, in the form of a profile for the user, what the server has determined to be the user's favorite categories, concepts and/or web sites. The tool may continue to upload new browsing events to the server so that the server can update the user's profile based on changes to the browsing history.

When the server has determined the categories and concepts in which the user is interested, the server may use this information to suggest content of interest to the user. This content may be selected from news, blogs, or other frequently updated content, although any type of content may be selected. In one example, the server identifies a set of items (e.g., news items, RSS feeds, etc.) that appear to be of interest to the user based on what the server has determined to be the user's favorite concepts and categories.

This summary is provided to introduce a selection of concepts in a simplified form that are further described below in the detailed description section. This summary is not intended to identify key features or essential features of the claimed subject matter, nor is it intended to be used to limit the scope of the claimed subject matter.

DETAILED DESCRIPTION

Figure 1:
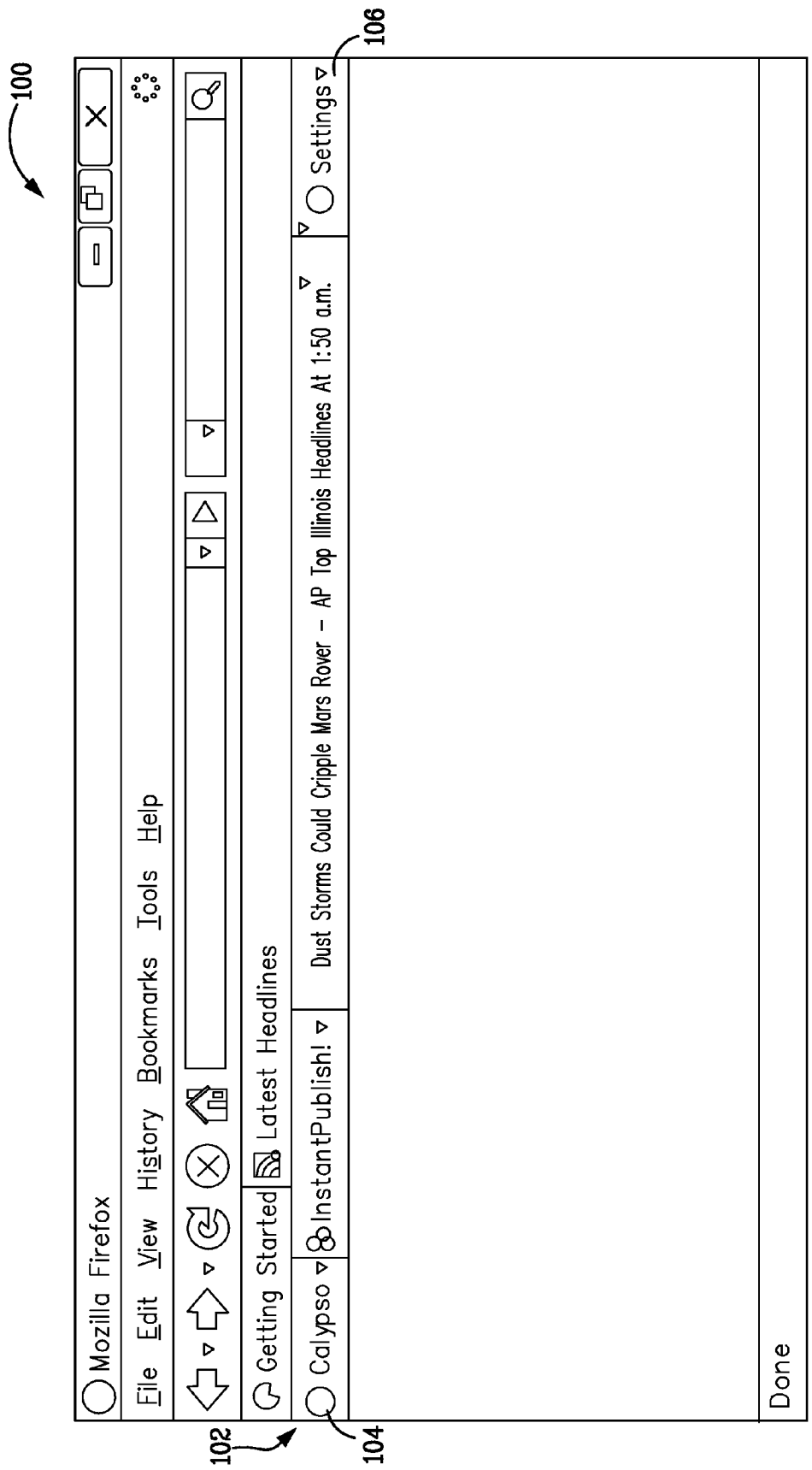
FIG. 1 is a block diagram of window of a browser in which a toolbar has been installed.

FIG. 1 shows a browser window 100, where a toolbar has been installed in a browser. An instance of the Mozilla Firefox browser is running in window 100, although any other browser could be used instead, such as Microsoft IE, Apple Safari, etc. The browser is extensible in the sense that extensions, plug-ins, etc., can be installed therein. One type of extension that can be installed is a toolbar. The toolbar 102 shown in FIG. 1 is one example of such a toolbar. Toolbar 102 provides, among other things, a button 104 (labeled "Calypso" in FIG. 1, which is an example name for some of the services described herein) which points the browser to certain web content that may be derived from a user's profile, as discussed in further detail below. Toolbar 102 also includes a button 106 that allows a user to access "settings", and some details of these settings are also discussed in further detail below. Throughout this document, various functionality is shown as being provided through a toolbar, although such functionality can also be provided by other mechanisms, such as through an additional browser menu, an invisible plug-in or add on that may not show visibly in the browser window, a pop-up menu, a status bar icon, a button in a browser, a stand-alone program, etc.

In addition to the functionality that is visible in the form of buttons 104 and 106, toolbar 102 (or the extension, plug-in, program, etc., of which it may be a part) may perform various actions, such as uploading the user's browsing history to a server, monitoring for changes in the user's browsing history, and uploading those changes to the server, which can be used to update the user's profile to reflect new browsing events.

Figure 2:
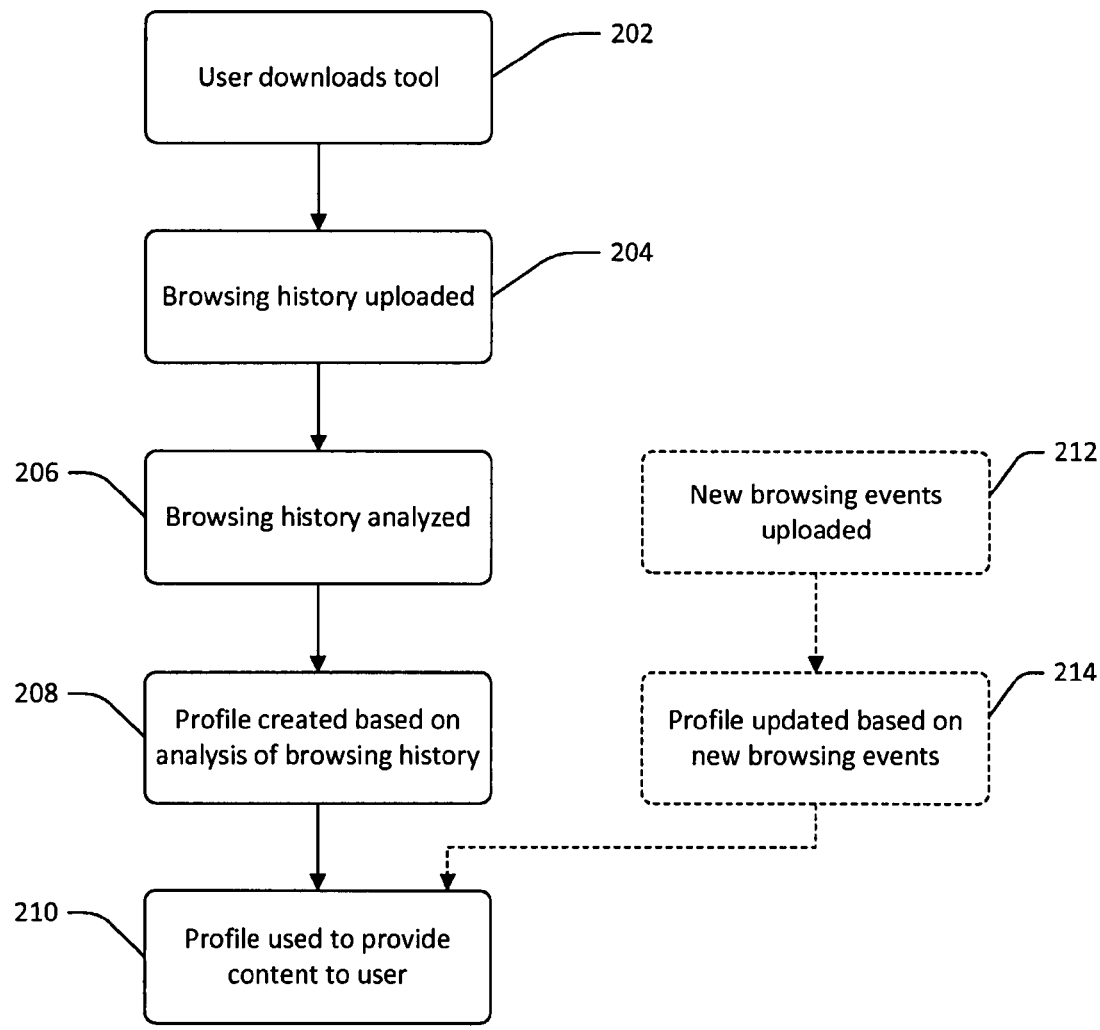
FIG. 2 is a flow diagram of an example process of collecting and using a user's browsing history.

FIG. 2 shows an example process whereby a user's browsing history may be harvested and used to select content for the user. It should be noted that the various stages shown in FIG. 2, and in other flow diagrams herein, may be performed in the order shown, but may also be performed in various combinations or sub-combinations, or in a different order. Moreover, the stages in FIG. 2 and other flow diagrams can be performed in the systems shown herein, but can also be performed in other systems.

At 202, a user downloads a tool (e.g., an extension, plug-in, ActiveX control, application, etc.). The tool may be installed in any manner, such as by installing an extension or plug-in into a browser where it operates as a toolbar, by installing a stand-alone application on the user's computer, etc.

At 204, the user's browsing history is uploaded to a server. Many browsers store a browsing history (e.g., the last three weeks worth of URLs that have been visited). The browsing history is typically stored in a file or collection of files on the user's machine. Obtaining this browsing history from the relevant file(s), and uploading it to the server, can be performed by, or facilitated by, the tool. The user may be asked for permission to upload the browsing history, or may have to explicitly instruct the tool to upload the browsing history, or may be advised that the browsing history is being uploaded. These are examples of measures that can be taken to make the user aware of the relevant privacy concerns.

It should be noted that it may be the case that the user's browsing history can be uploaded to a server, and content can be selected by the server based thereon, with a relatively low level of input from the user. For example, it may be the case that the user's involvement is limited to installing the toolbar, instantiating the toolbar software (or the browser of which the software is a part), and/or possibly responding to a communication concerning the uploading of the user's browsing history (e.g., an inquiry as to whether the user will allow the browsing history to be uploaded).

At 206, the user's browsing history is analyzed by the server. For example, the server may examine the list of URLs that the user has visited (as indicated in the browsing history), and may identify what concepts and substantive categories are reflected in those URLs. (Concepts may be based on a catalogue of words that appear in particular web content, while categories may be substantive groupings chosen by the server's operators. For example, words like "money," "stocks," and "bonds" may be concepts, and human beings as the operator of the server may have determined that "finance" is a substantive category whose relevance in a particular piece of web content can be identified by the use of words such as "money," "stocks," and "bonds." Concepts and categories can be either "flat" (e.g., "sparrows" or "stocks"), or can be arranged in a hierarchy (e.g., "animals/birds/sparrows" or "money/investments/stocks".)) At some time (e.g., prior to receiving the user's browsing history), the server may have done an analysis of certain web sites in order to determine what concepts and substantive categories particular URLs represent—e.g., the server may have examined web sites in the past and determined that a web site such as "www.theonion.com" relates to concepts such as humor, politics, and news. If the user has visited that web site, then the server may conclude, based on its analysis, that the user is interested in those concepts. This conclusion may be made stronger if the user has visited other web sites that, in the view of the server, relate to the same or similar concepts.

At 208, a profile is created based on analysis of the browsing history. As in the preceding example, if, based on the user's browsing history, the user often appears to visit web sites relating to humor, politics, and news, the server may put those concepts into the user's profile, possibly with values (e.g., numerical values) indicating how strongly the user appears to affiliate with those concepts.

At 210, the profile is used to provide content to the user. For example, if analysis of the user's browsing history indicates that the user has a high affiliation with humor and politics, then web content that has been determined to incorporate these types of concepts may be selected for the user. In one example, news content or blogging content, such as that which might be contained in an RSS feed, may be selected for the user in order to provide the user with fresh content that falls into categories of the user's interest, rather than old or static content. As another example, content may be selected based on when it was last changed (e.g., content may be selected based on having been changed within the last 24 hours, or some other duration of time, which may be specified by a user). As a further example, content may be selected based on whether it is derived from a web site that offers an RSS feed, where sites that offer such feeds are selected based on a presumption that they are more likely to offer fresh content. However, any type of content may be selected and provided. Examples are further discussed below of the type of content that can be provided to the user, or the form in which it can be provided. One such examples is that a page of links to content such as news sites, RSS feeds, etc., can be provided to the user in visual association with the concepts to which these links relate.

In addition to an initial upload of the user's browsing history (as shown at 204), new browsing events may be uploaded to the server in order to provide new browsing events and to reflect the continually-changing history of the user's browsing. Updates based on new browsing events may be provided at 212, and the server may update the profile based on such new browser events (at 214). The profile, as updated in this manner, may be used to provide content to the user (at 210).

Figure 3:
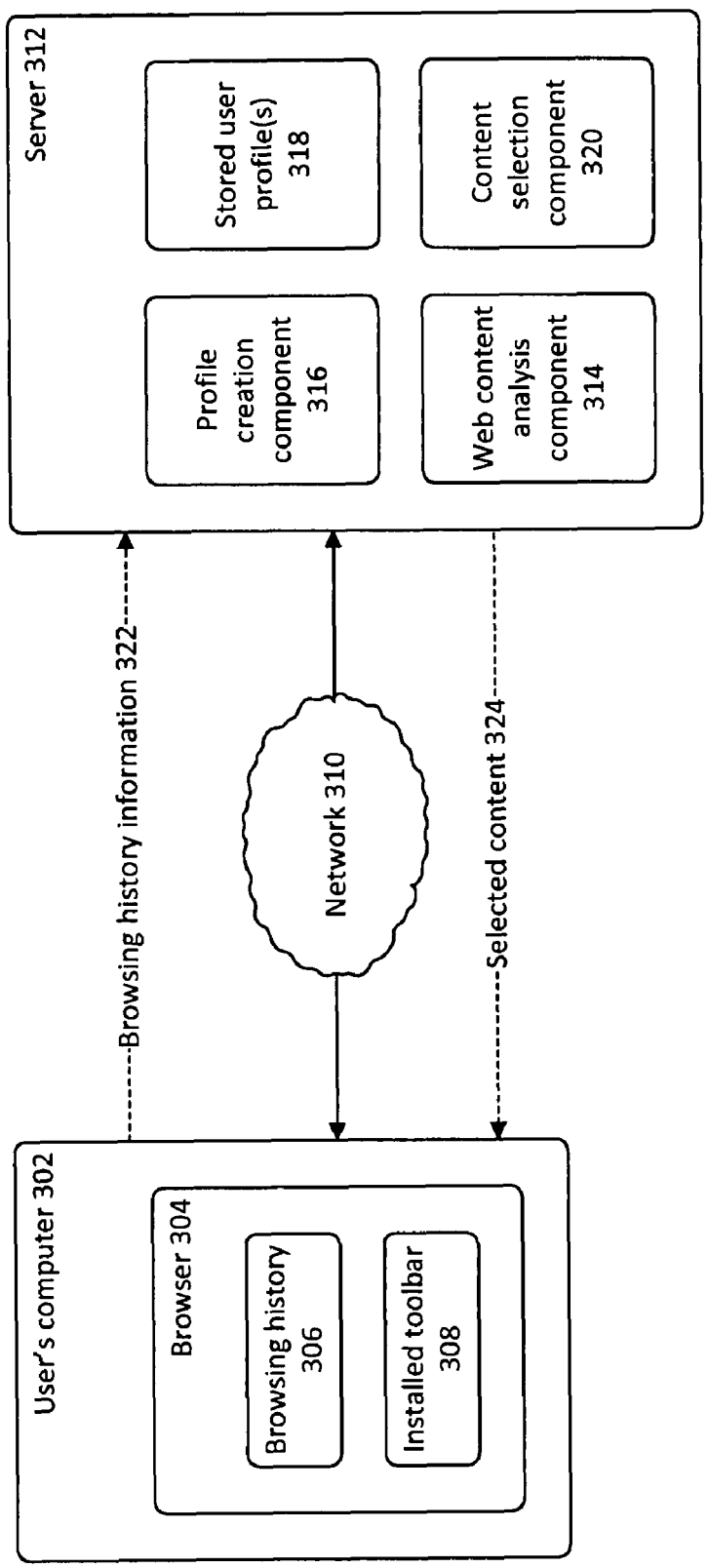
FIG. 3 is a block diagram of an example arrangement in which the subject matter described herein may be implemented and/or deployed.

FIG. 3 shows an example arrangement of components in which a user's browsing history may be used to provide content for that user. User's computer 302 is a computer, such as a desktop, laptop, handheld, etc. Browser 304 comprises browsing software that is stored in user's computer 302. Browser 304 may store a browsing history 306. Additionally, extension, plug-ins, ActiveX controls, etc., such as toolbar 308, may be installed in, or for use with, browser 304. FIG. 3 shows browser 304 as being inside computer 302, although it should be noted that browser 304 need not be stored in computer 302, but could be stored in someplace usable by computer 302, such as on an external disk or network disk. Similarly, FIG. 3 shows browsing history 306 and toolbar 308 as being inside browser 304, although this depiction is merely a conceptual example, and these components could be located anyplace where they are usable in conjunction with browser 304.

User's computer 302 may communicate with another computer, such as server 312, and such communication may take place through a network 310, such as the Internet. Server 312 may refer to a computer, or collection of computers, that provide server-type functionality, or may refer to software that provides such functionality. Server 312 may comprise or provide one or more of the following: web content analysis component 314, profile creation component 316, stored user profile(s) 318, and a selection component 320.

Web content analysis component 314 analyzes web content, such as HTML web pages, news items, RSS feeds, etc., and determines, for example, what types of concepts or substantive categories may be associated with those web pages. For example, web content analysis component 314 may analyze web content and determine what types of concepts (e.g., stocks, java, flights, patents, etc.), or categories (e.g., technology, finance, society, etc.) may be associated with a particular URL. The analysis of URLs may be an ongoing process in order to collect, and update, a knowledge base of the type of content that exists throughout the web. The result of this analysis can be stored, so that information about web content can be used to create a profile for a user based on URLs that the user has visited.

Profile creation component 316 creates a profile for a user, based on information about the user's interests, such as the user's browsing history. For example, profile creation component 316 may identify the concepts and categories associated with particular URLs that the user has visited (where those concepts and categories have been gleaned by web content analysis component 314), and may include such concepts and categories in the user's profile. Profile creation component 316 may assign values (e.g., numeric weights) to specific concepts or categories based on how much weight these concepts and categories appear to have in the user's browsing history (e.g., concepts and categories may be given a higher or lower weight based on factors such as: how many different URLs the user has visited that incorporate these concepts or categories, how often the user visits URLs associated with a particular concept or category, etc.) Additionally, profile creation component 316 may take into account explicit input from a user—e.g., a user may be allowed to explicitly "subscribe" to a particular concept or category, which can then be made part of the user's profile. (The concept or category to which the user has subscribed can be one of the concepts or categories that profile creation component 316 selected for the user based on the user's browsing history, or it can be a category of that the user selects independently of his or her browsing history.)

Stored user profile(s) 318 are profiles that server 312 has stored for various user. For example, there may be thousands (or millions, or tens millions, etc.) of users who install tool 308 and who choose to have a profile create in order to receive content based on their interests. Stored profile(s) 318 may be part of a database that stores these various profiles. Different users may each have accounts (or some mechanism to identify a particular user, such as a cookie) so that, when a given user contacts the server, that user can be identified and the right profile can be used.

Content selection component 320 selects content to be delivered to the user based on the user's profile, and based on analysis of web content. The analysis of web content that is used to inform content selection component 320 may be created by web content analysis component 314. In this sense, it should be noted that the information that web content analysis component 314 generates about existing web content may have two roles: first, it may be used as a way to create a profile for a user, by providing data on what types of concepts and categories are associated with URLs that the user has visited; and second, it may be used as a way to select new content for the user, by providing information on existing web content that can be compared with the user's profile to select such new content. The content selected by content selection component 320 may include, for example, news items, RSS feeds, web sites, etc. As noted above, content selection component 320 may focus on "fresh" content—e.g., content that tends to be updated frequently, such as RSS feeds, web sites that provide RSS feeds, web sites that have been updated in the last 24 hours, etc., although content selection component 320 could select any type of content.

As previously noted, a user may upload his or her browsing history to a server (e.g., to server 312), and the server may provide selected content to the user based on the browsing history. In FIG. 3, the upload of the user's browsing history information (322), and the provision of content to the user by the server (324), are indicated by arrows. The upload of the browsing history, and the download of the content, may be performed through network 310.

FIGS. 4-11 show various features, as such features might be displayed on a web site. For example, server 312 may implement a web site that provides various features through a web browser, and what is shown in FIGS. 4-11 may indicate how these features would be seen as web pages delivered through a web browser. However, it should be understood that the depictions of these features in FIGS. 4-11 are merely examples, and these features can be used in any context or system.

Figure 4:
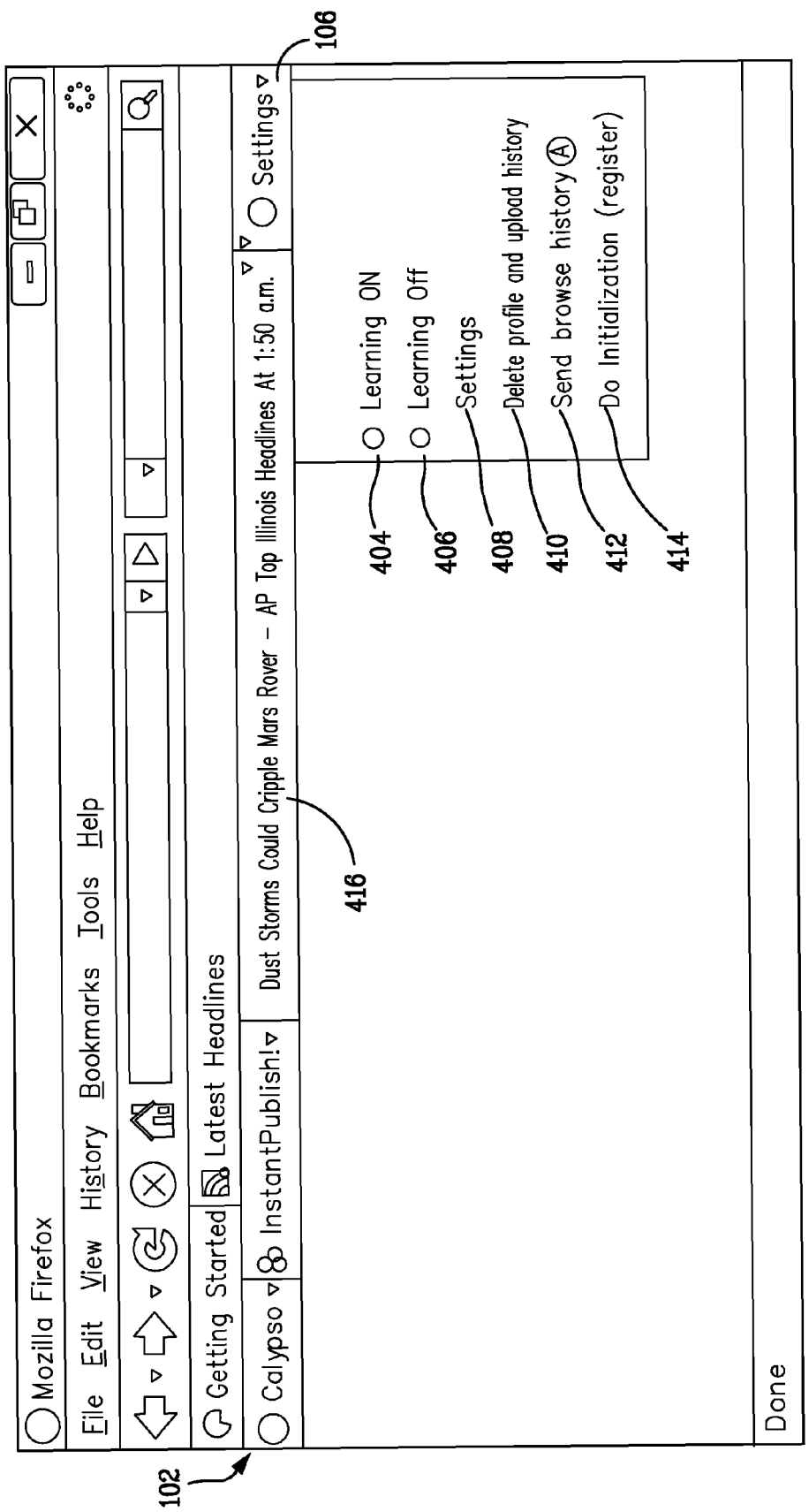
FIGS. 4-10 are views of user-interface displays that show certain features of the subject matter described herein.

In FIG. 4, toolbar 102 has been installed in a browser. One feature of toolbar 102 is settings button 106. Settings button 104 may have a drop-down menu, which includes various options. These options may include: A "learning on" option 404; a "learning off" option 406; a "settings" option 408; an option to delete and upload history (410); an option to send the current browse history (412); and an option to do an initial run and/or register a user (414).

Learning refers to a process whereby new browsing events are uploaded to the servers after an initial upload of the user's browsing history. (E.g., as discussed above in connection with FIG. 2 at 212 and 214.) The learning on and off options (404 and 406) may be used to turn this feature on or off. For example, if a user wants to keep browsing private and not communicate the details of the user's browsing to server 312 (shown in FIG. 3), the user may use option 406 to turn browsing off, and may then use option 404 to turn browsing on later (e.g., if privacy is no longer a concern). Pages that are secure (e.g., those accessed with "https"), may be omitted from the learning process, which may assist in preserving the user's privacy.

Setting option 408 allows various parameters to be set for toolbar 102. For example, settings 408 may generate a dialog box where the user can set the identity of one or more servers that are involved in the processes of receiving the user's browsing history and providing content to the user based on the profile. As another example, toolbar 102 may provide running content, such as news ticker 416, and the dialog box provided when settings option 408 is selected may allow the news ticker to be turned on or off.

Option 410 may be used to start the user's profile over—e.g., by deleting the user's profile from the server and uploading the user's current browsing history anew. Similarly, option 412 may be used to upload the user's browsing history, but without deleting an old browsing history. Option 414 may be used to start the initial registration of the user—e.g., the process whereby a user name and password are set, so that when the browsing history is uploaded and the profile is created, there will be a particular user with whom to associate the profile.

Figure 5:
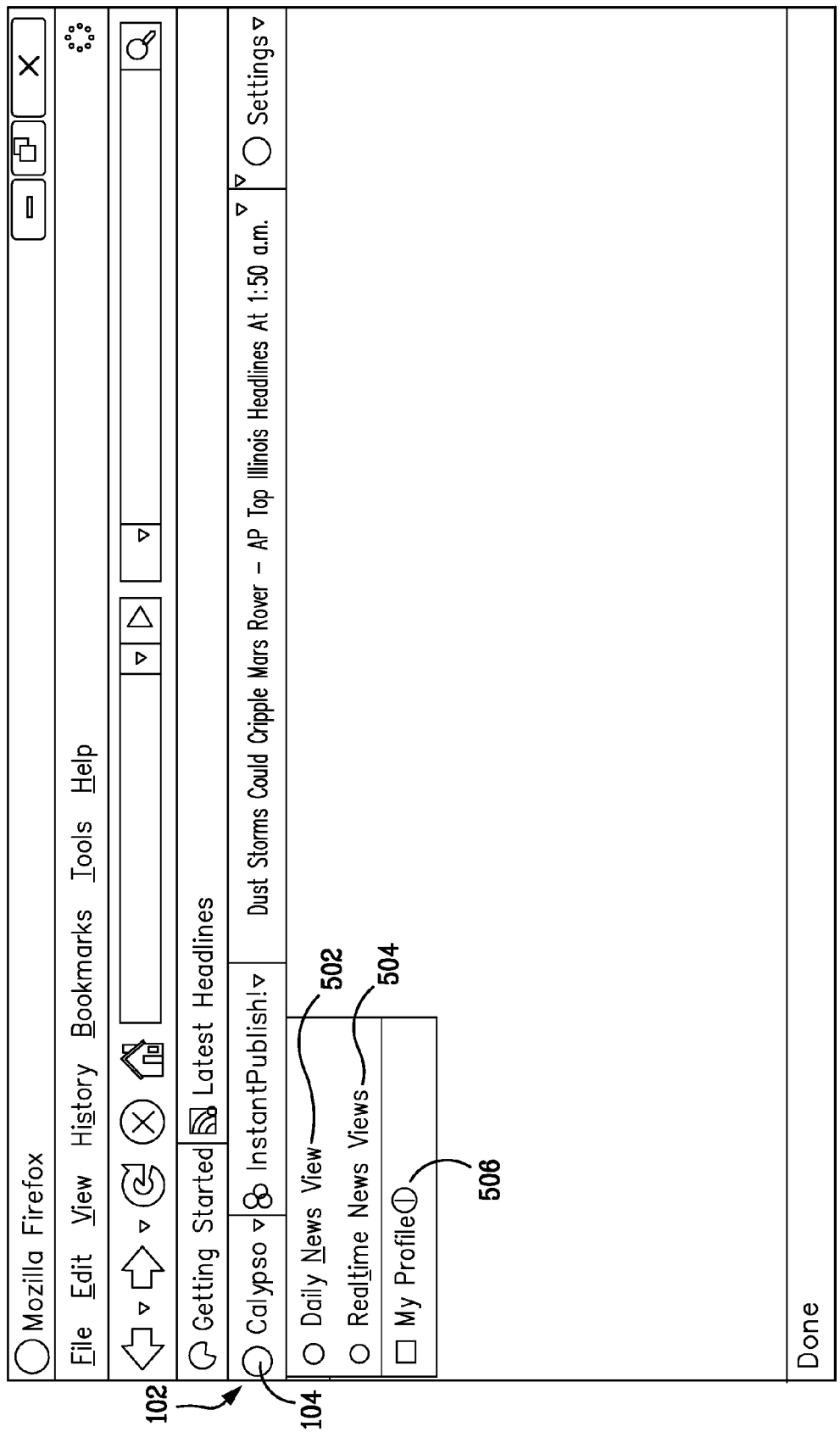

In FIG. 5, toolbar 102 is shown, including button 104. Button 104 may provide a drop-down menu that includes options 502, 504, and 506. When option 502 is selected, the user may be brought to a web page that provides certain customized content for the user (such as the page shown in FIG. 6, as discussed below). When option 504 is selected, the user may be brought to a page showing real-time news. When option 506 is selected, the user may be brought to a page showing the user's profile (such as the page shown in FIG. 10, as discussed below). Clicking button 104, without pulling down the drop-down menu, may result in a default one of options 502, 504, and 506 being selected—e.g., clicking button 104 may, by default, select option 502 and bring the user to the web page discussed below in connection with FIG. 6.

Figure 6:
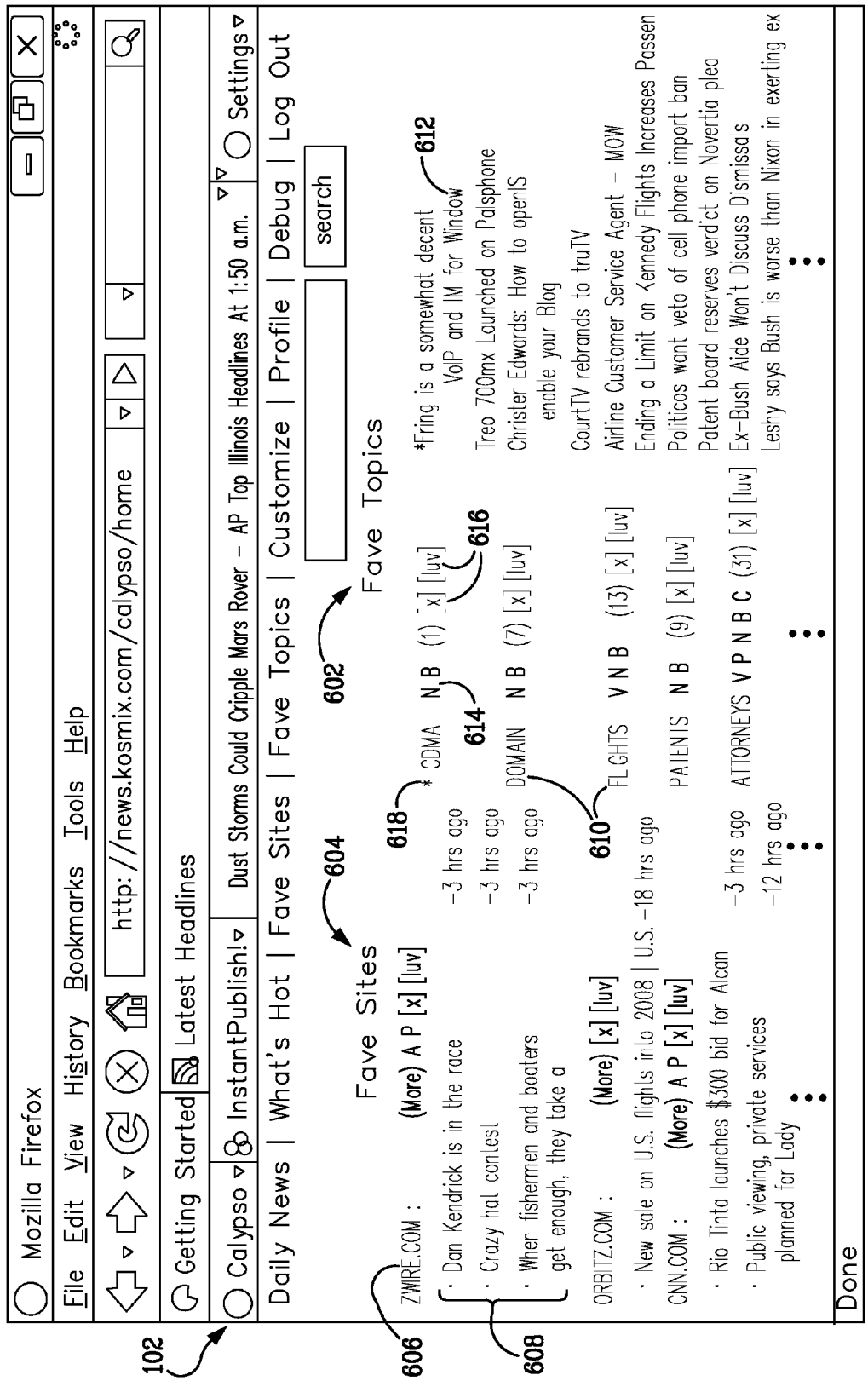

In FIG. 6, toolbar 102 is shown, and the page shown in the browser window may be the page generated by clicking button 104 (shown in FIG. 5). For example, clicking that button may bring the user to a page named http://news.kosmix.com/calypso/home, and may upload the user login/account/registration information as part of the request for that page (e.g., as part of a POST request).

The resulting page that is returned contains certain information that has been customized for the user, which may be based on a profile for the user. This information may have been created based the user's uploaded browse history, and also based on updates generated through the learning process mentioned above. The page may include a list of favorite sites 602, and a list of favorite topics 604. For example, favorite sites 602 may include the web sites most frequently visited by the user, as indicated by his or her browsing history. The list of favorite topics 604 may include a list of topics (e.g., concepts, substantive categories, etc.) in which the user is, or appears to be, interested, as indicated by an analysis of his or her browsing history. The list of favorite topics and/or sites may also include sites and/or topics in which the user has explicitly indicated interest. (The sites in which the user explicitly indicates interest may or may not be included among those sites or topics in which the user's interest was identified based on an analysis of the user's browsing history.) Those sites or topics in which the user explicitly indicates interest may be marked with some type of indicator (e.g., star 618). For example, in FIG. 6, CDMA is a topic to which the user has explicitly subscribed, as indicated by the star next to that topic.

Regarding the list of favorite sites 602, within the list there may be an identification of a particular site 606, as well as a list 608 of one or more recent items that have been posted on the site. For example, if a particular web site in list 602 has an RSS feed associated with it, then the recent items list 608 may contain recent additions to the RSS feed. Regarding the list 604 of favorite topics, this list may include topics—e.g., topics 610. For a given topic, there may be a list 612 of one or more content items that relate to that topic. In one example, the content items in list 612 may be RSS feeds, or other frequently updated items, although the content in list 612 may include more traditional content items, such as HTML web pages.

Next to a given topic or site in list 602 or 604, there may be one or more indicators 614 of the type of content that exists at that site. For example, letters next to the various sites and topics may indicate the presence of video (V), audio (A), a podcast (P), a blog (B), a comment (C), or news (N). As an alternative to the letters, symbols or some other type of indicator could be used.

Additionally, there may be one or more controls 616 next to the various sites or topics, which the user can click to perform various actions. In the example of FIG. 6, controls include an "x" (indicating the user wishes to remove the site or topic from the list and from the user's profile), and "luv" (indicating that the user "loves" the topic or site and wishes to subscribe to it explicitly).

Figure 7:
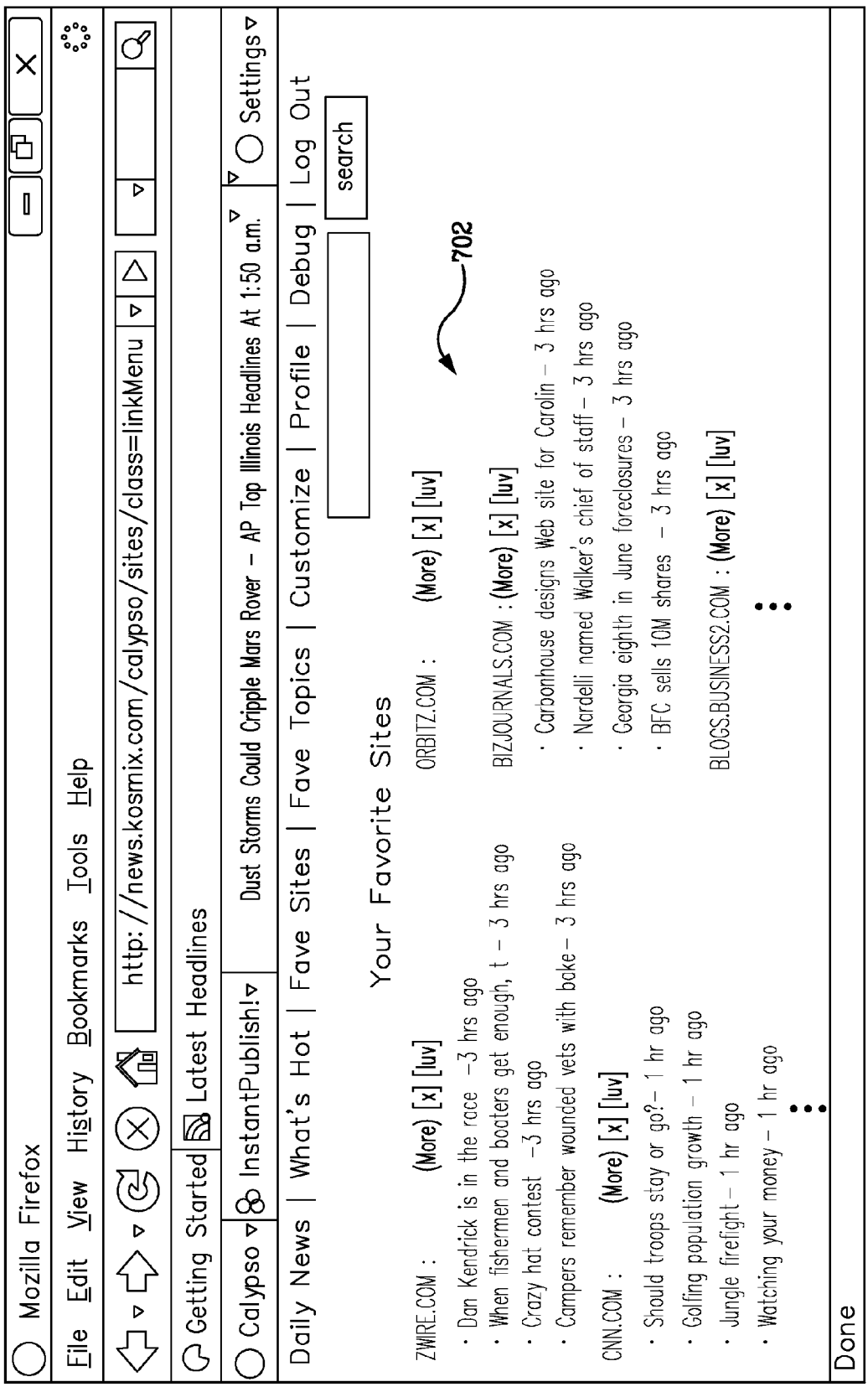
Figure 8:
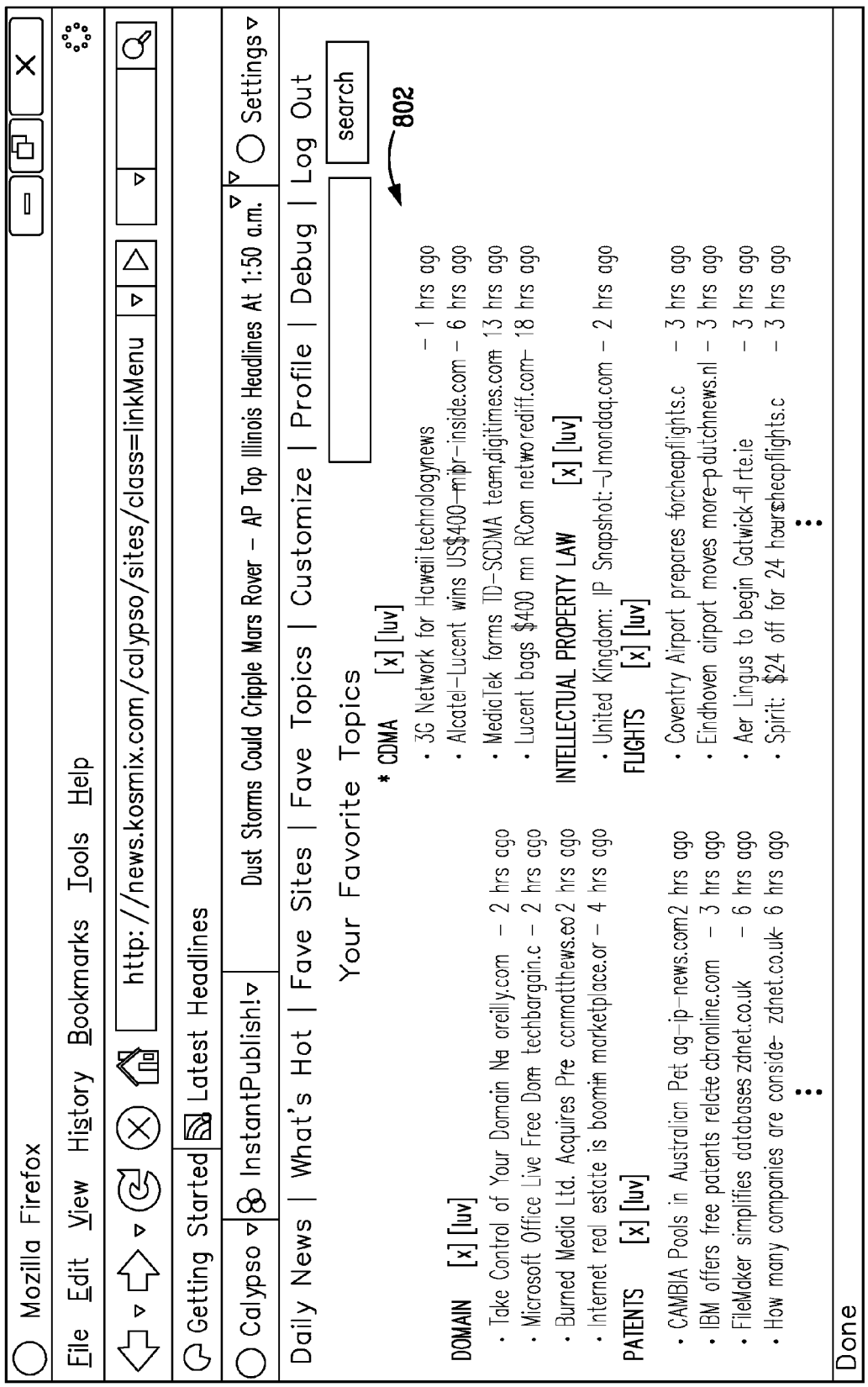

In FIG. 7, a list 702 of favorite sites is shown. For example, the user may be able to click the "Fave Sites" link, and view a list of sites similar to the list 602 (shown in FIG. 6). However, since the full page shown in FIG. 7 is devoted to the favorite sites, list 702 may contain additional information or more detail than list 602. Similarly, FIG. 8 shows a list 802 of topics, which may be similar to the list 604 (shown in FIG. 6), but since the full page is devoted to a list of topics, list 802 may contain additional information or more detail than list 604. The page shown in FIG. 8 may be obtained, for example, by clicking the "Fave Topics" link.

Figure 9:
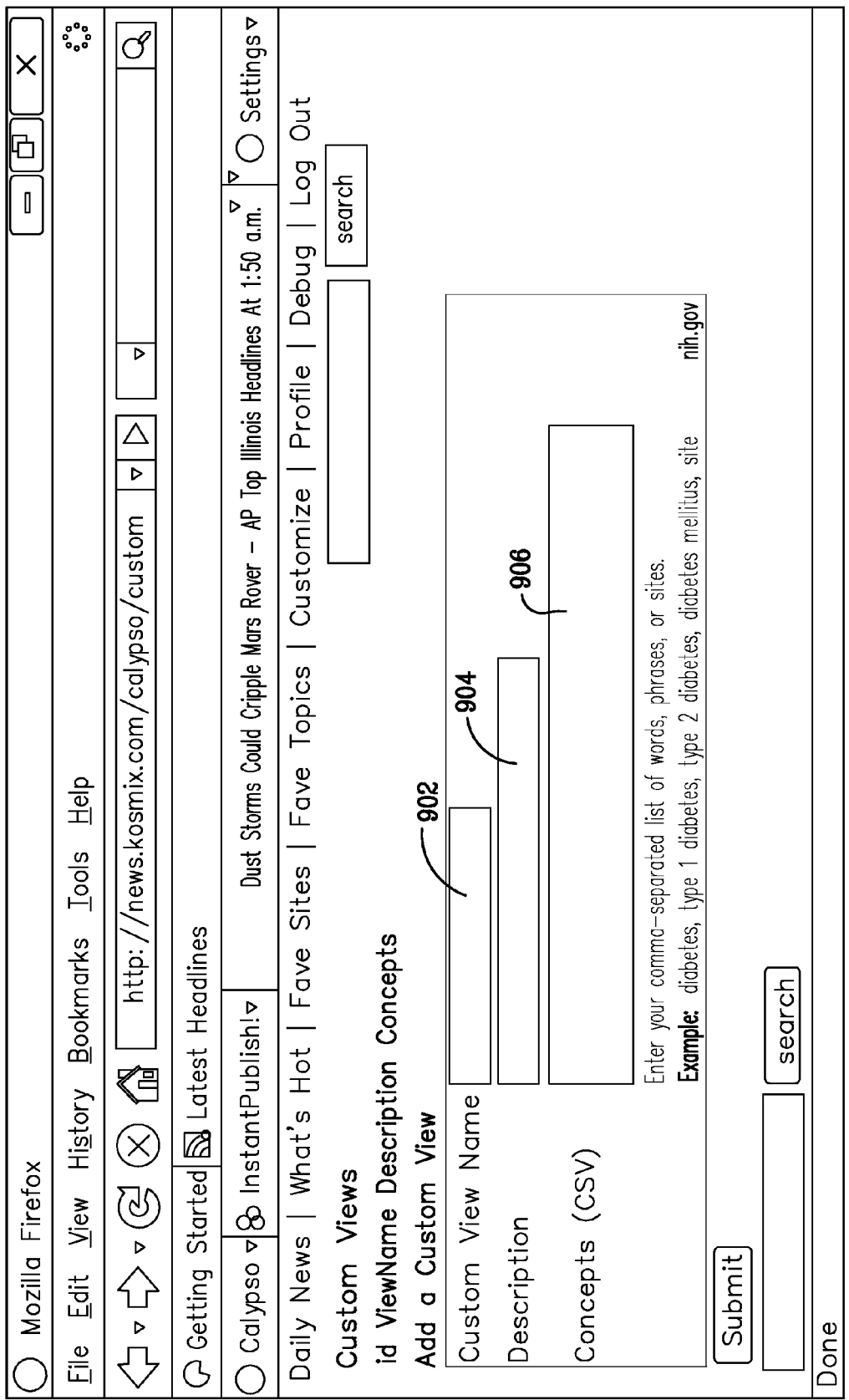

In FIG. 9, a page is shown whereby a user may add a custom view. The page of FIG. 9 may be reached, for example, by clicking the "Customize" link. The page includes a box 902 where a name for the view may be entered, a box 904 where a description of the view may be entered, and a box 906 where a set of concepts on which the view is to be based may be entered. For example, referring back list 604 in FIG. 6, topics in this list are associated with a list of content items that relate to those topics. If a custom view were created using the page in FIG. 9, then an item having the name entered in box 902 could appear in the list of topics, and content items based on the concepts specified in box 904 could appear next to that item. The custom-created "view" could then appear as a topic either in the topics list 604 of FIG. 6, or in the list 802 of FIG. 8.

Figure 10:
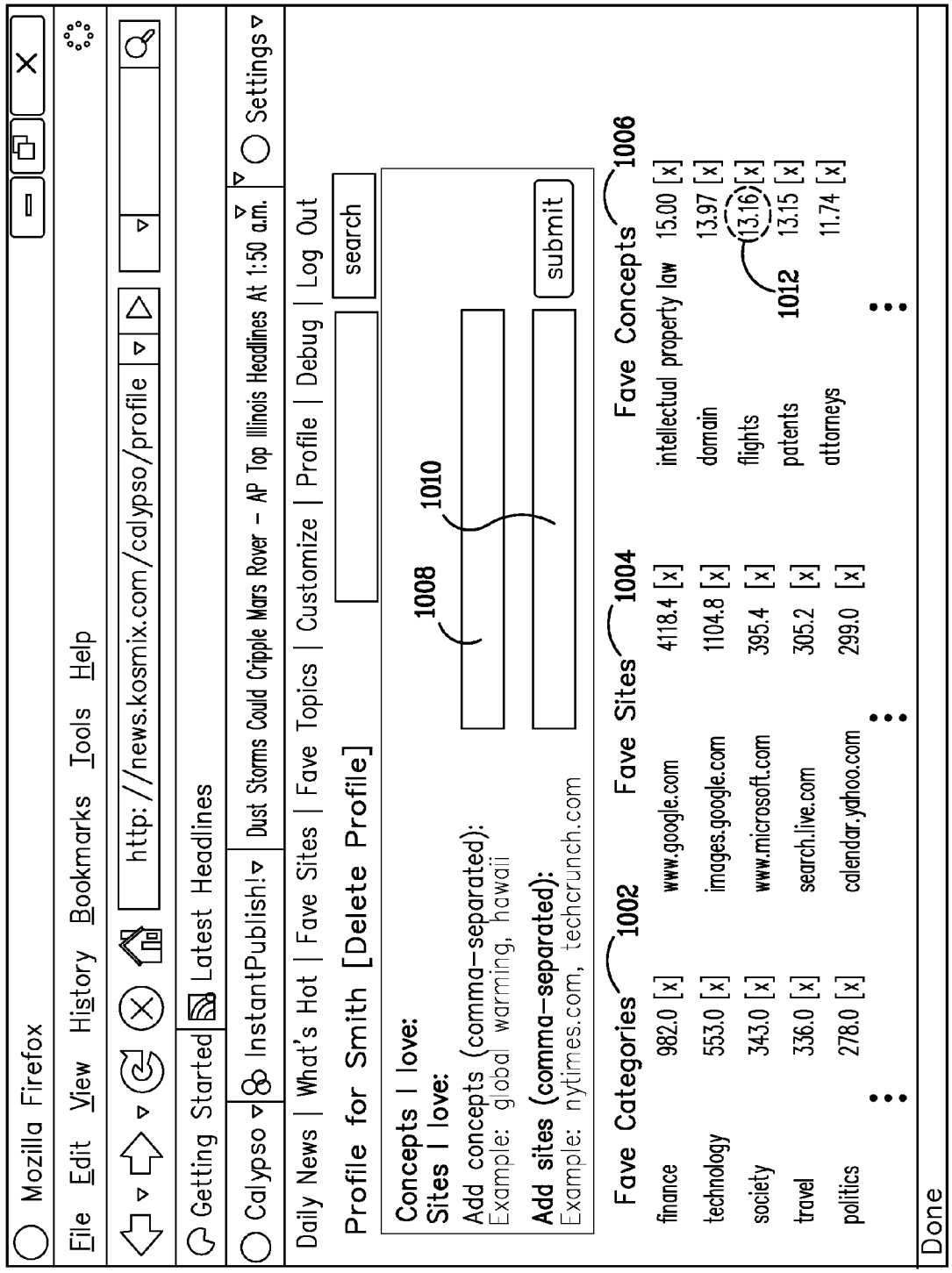

FIG. 10 shows an example profile for a user, as displayed in a web browser. The profile, in this example, includes a list of categories 1002, a list of sites 1004, and a list of concepts 1006. The profile, as previously noted, can be generated from a browsing history. The list 1004 of sites may be derived from the list of URLs that the user has visited, as indicated in the browsing history. Moreover, the list 1002 of categories, and the list 1006 of concepts, may be derived from those categories and concepts that are associated with the URLs that the user has visited. The page may also give the user the opportunity to add concepts or sites explicitly, through boxes 1008 and 1010. The page may also allow categories and concepts to be deleted (e.g., by clicking the symbol "x" next to a particular site, category, or concept). The page may also list sites and concepts that the user "loves" (e.g., that the user has explicitly subscribed to, such as by clicking the "luv" symbol next to a site or concept, as described above). Sites or concepts to which the user has explicitly subscribed may be indicated in the "Concepts [or sites] I love" lists in the page, or may be indicated with a star (or other symbol), as previously described.

Categories, sites, and concepts may be associated with a score (e.g., score 1012), which may indicate the weighted importance of a particular category, site, or concept in the user's profile. For example, sites that the user has visited frequently (or that are otherwise prevalent in the user's browsing patterns) may receive a high score, while sites that the user has visited infrequently may receive a low score. Similarly, categories and concepts that arise frequently, based on the URLs that the user has visited, may receive high scores, and categories and concepts that do not arise frequently based on those URLs may receive low scores. The relative importance of particular categories, sites, and concepts may, for example, be used to identify which sites and topics should appear at the top of the lists shown in FIGS. 6-9.

Figure 11:
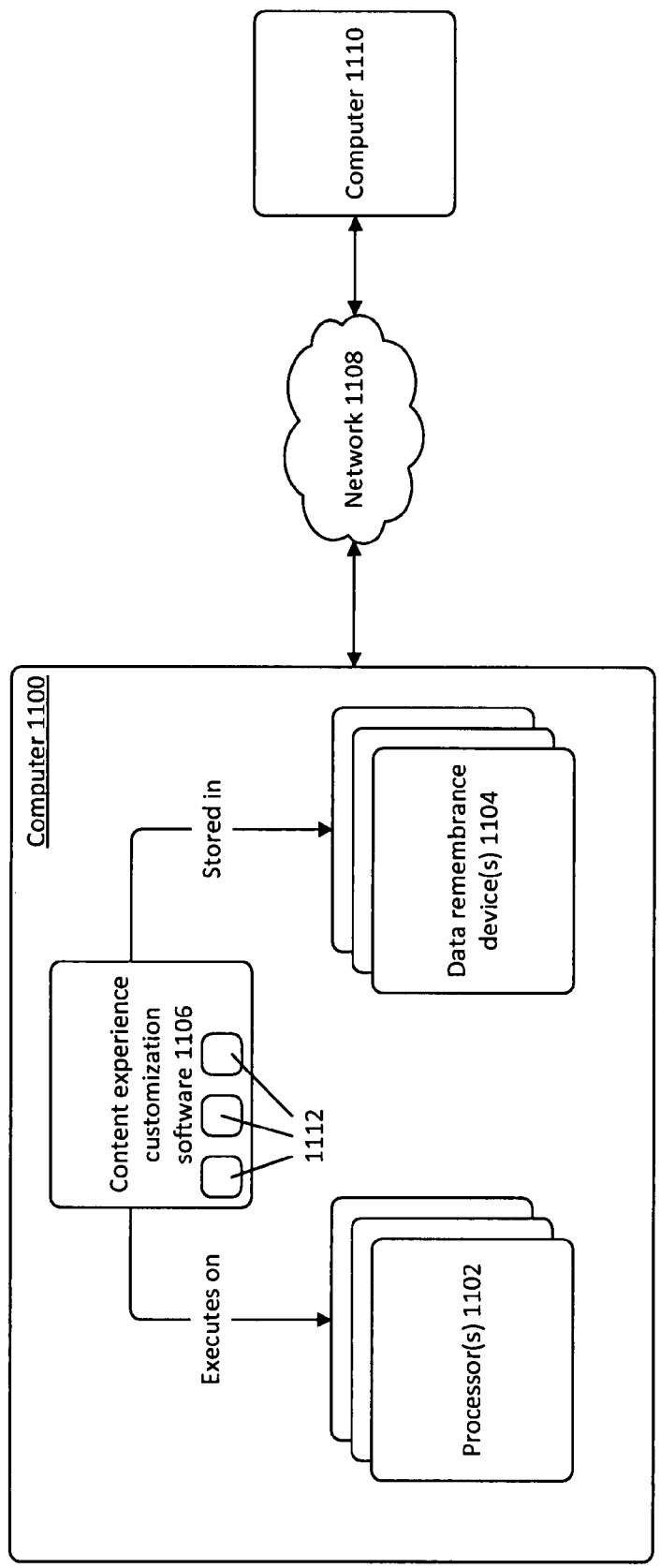
FIG. 11 is a block diagram of an example computing environment in which the subject matter described herein, or aspects thereof, may be deployed.

FIG. 11 shows an example environment in which aspects of the subject matter described herein may be deployed.

Computer 1100 includes one or more processors 1102 and one or more data remembrance devices 1104. Processor(s) 1102 are typically microprocessors, such as those found in a personal desktop or laptop computer, a server, or a handheld computer. Data remembrance device(s) 1104 are devices that are capable of storing data for either the short or long term. Examples of data remembrance device(s) 1104 include hard disks, removable disks (including optical and magnetic disks), volatile and non-volatile random-access memory (RAM), all types of read-only memory (ROM), flash memory, magnetic tape, etc. Data remembrance device(s) are examples of computer-readable storage media.

Software may be stored in the data remembrance device(s) 1104, and may execute on the one or more processor(s) 1102. An example of such software is content experience customization software 1106, which may implement some or all of the functionality described above in connection with FIGS. 1-10. Software 1106 may be implemented, for example, through one or more subsystems 1112; these subsystems may be components in a distributed system, separate files, separate functions, separate objects, separate lines of code, etc. A personal computer in which a program is stored on hard disk, loaded into RAM, and executed on the computer's processor(s) typifies the scenario depicted in FIG. 11, although the subject matter described herein is not limited to this example.

The subject matter described herein can be implemented as software that is stored in one or more of the data remembrance device(s) 1104 and that executes on one or more of the processor(s) 1102. As another example, the subject matter can be implemented as software having instructions to perform one or more acts, where the instructions are stored on one or more computer-readable media. In addition to being stored on storage media, instructions can be carried on communications media—e.g., in the form of electrical signals, magnetic signals, optical signals, etc., that exist ephemerally.

In a typical environment, computer 1100 may be communicatively connected to one or more other devices through network 1106. Computer 1110, which may be similar in structure to computer 1100, is an example of a device that can be connected to computer 1100, although other types of devices may also be so connected. User's computer 302 and server 312 (shown in FIG. 3) may each be examples of computers 1100 and 1110.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of providing content to a user, the method comprising:
   receiving, from a computer associated with the user, a browsing history;
   identifying one or more concepts associated with one or more Uniform Resource Locators (URLs) in said browsing history;
   selecting one or more items of web content based on a first relationship between said one or more concepts and said one or more items; and
   providing, to the user, an identification of said one or more items of web content,
   wherein said selecting is further based on a determination of which web sites provide feeds, and wherein said selecting omits, from said one or more items of web content, those items located on web sites that do not provide feeds.

2. The method of claim 1, further comprising:
   downloading, to said computer, toolbar software that implements a toolbar that is installable in a browser from which said browsing history was generated;
   wherein said toolbar uploads said browsing history from said computer to a server.

3. The method of claim 2, wherein said toolbar displays recurrently-changing news items in a space of a window of said browser that is reserved for said toolbar.

4. The method of claim 2, wherein said toolbar solicits the user's permission to upload said browsing history prior to said receiving.

5. The method of claim 2, wherein said toolbar recurrently uploads new events in said browsing history to said server.

6. The method of claim 2, wherein said toolbar has a learning mode that can be turned on and off at election of the user, wherein said toolbar recurrently uploads new events in said browsing history to said server when said learning mode is turned on, and wherein said toolbar does not upload new events in said browsing history to said server when said learning mode is turned off.

7. The method of claim 2, wherein said selecting is performed either without any action by the user, or without any action by the user other than one or more of the following:
   installation of said toolbar;
   instantiation of said toolbar; and
   responding to a communication concerning uploading of the browsing history.

8. The method of claim 1, wherein said first relationship comprises a matching between concepts associated with said one or more items of web content and concepts associated with said URLs in said browsing history.

9. The method of claim 1, further comprising:
   creating a set of one or more categories in which substance of web content may fall; and
   identifying one or more of said categories that are associated with said one or more URLs;
   and wherein said selecting is further based on a second relationship between said one or more categories and said one or more items.

10. The method of claim 1, further comprising:
    prior to said receiving, analyzing existing web content to identify which concepts are associated with content located at particular URLs;
    recording one or more results of said analyzing; and
    using said one or more results in said selecting.

11. The method of claim 1, wherein said selecting is further based on whether the content has been updated within a duration of time, and wherein said selecting omits, from said one or more items of web content, those items that have not been updated within said duration of time.

12. The method of claim 11, further comprising:
receiving, from the user, a specification of said duration of time; and
setting said duration of time in accordance with said user's specification.

13. The method of claim 1, wherein said providing comprises:
transmitting, to said computer, a page that is displayable in a browser and that comprises:
a list of one or more topics, where each of said topics is visually grouped with one or more of said identifications of one or more items of web content, the grouping of said topics with said identifications being based on whether concepts associated with said topic are included in said items of web content.

14. The method of claim 1, further comprising:
creating a profile for the user, wherein the profile comprises said one or more concepts, and wherein said selecting is based on said profile.

15. The method of claim 14, further comprising:
receiving, from said user, an identification of a first concept that the user specifies to be included in said profile; and
including said first concept in said profile.

16. The method of claim 15, wherein said first concept is included within said one or more concepts.

17. The method of claim 15, wherein said first concept is not included within said one or more concepts, and is not identified based on a server's analysis of said browsing history.

18. The method of claim 15, wherein said providing comprises:
communicating, to the user, a page comprising: (a) said first concept, and (b) a visual cue indicating that said first concept has been explicitly specified by the user.

19. The method of claim 14, wherein said profile further comprises a set of categories of web content and a set of one or more web sites indicated by said one or more URLs in said browsing history.

20. The method of claim 19, wherein said profile further comprises one or more numerical values associated with at least one of said concepts, categories, and sites, wherein said one or more numerical values indicate prevalence of said concepts, categories, or sites in said browsing history.

21. A system comprising:
one or more processors;
one or more data remembrance devices; and
software that is stored in said one or more data remembrance devices and that executes on said one or more processors, said software comprising one or more subsystems, said one or more subsystems comprising:
a first subsystem that implements a web browser and that records a history of Uniform Resource Locators (URLs) visited with said web browser; and
a second subsystem that implements a toolbar installed in said web browser, said second subsystem uploading said history to a server without said user having to perform an action other than one or more of the following: (a) installation of said toolbar; (b) instantiation of said toolbar; and (c) responding to a communication concerning uploading of said history; said web browser displaying, to said user, content, or an indication of said content, that is received from said server that is selected based on a relationship between concepts derived from said URLs and concepts contained in said content,
wherein said content, or said indication of said content, is selected based further on whether said content is derived from a web site that provides an RSS feed, wherein content that is derived from web sites that do not provide RSS feeds is not selected.

22. A system that provides content to a user, the system comprising:
means for receiving, from a computer associated with the user, a browsing history;
means for identifying one or more concepts associated with one or more Uniform Resource Locators (URLs) in said browsing history;
means for selecting one or more items of web content based on a relationship between said one or more concepts and said one or more items; and
means for providing, to the user, an identification of said one or more items of web content,
wherein said means for selecting selects said one or more items of web content further based on whether said items of web content are derived from web sites that provide RSS feeds, wherein items of web content derived from web sites that do not offer RSS feeds are not selected.

23. The system of claim 22, further comprising:
means for providing a toolbar that is installable in a browser that generates said browsing history.

24. One or more computer-readable storage media comprising executable instructions to provide content, the executable instructions, when executed by a computer, causing the computer to perform acts comprising:
installing a toolbar in a browser that runs on a computer;
uploading, to a server, a browsing history generated by use of said browser;
receiving, from said server, one or more content items that are selected by said server based on factors comprising:
said browsing history;
a determination of which web sites provide feeds;
a first indication, received explicitly from a user of said computer, of one or more web sites in which said user is interested;
a second indication, received explicitly from said user, of one or more categories in which said user is interested;
a third indication, received explicitly from said user, of one or more concepts in which said user is interested; and
a duration of time within which a site is to have been updated in order to be selected by said server, wherein said server omits, from said one or more content items:
those items located on web sites that do not provide feeds;
those items located on web sites that have not been updated within said duration of time;
those items outside of categories specified by said second indication; and
those items unrelated to concepts specified by said third indication; and
communicating an identification of said one or more content items to said user, said identification of said one or more content items including a fourth indication of which content items have been explicitly indicated by said user in said first indication.

25. The one or more computer-readable storage media of claim 24, wherein said toolbar has a learning mode that can be turned on and off at election of the user, wherein said toolbar recurrently uploads new events in said browsing history to said server when said learning mode is turned on, and wherein said toolbar does not upload new events in said browsing history to said server when said learning mode is turned off.

26. A method of providing content, the method comprising:
   installing a toolbar in a browser that runs on a computer;
   uploading, to a server, a browsing history generated by use of said browser;
   receiving, from said server, one or more content items that are selected by said server based on factors comprising:
      said browsing history;
      a determination of which web sites provide feeds;
      a first indication, received explicitly from a user of said computer, of one or more web sites in which said user is interested;
      a second indication, received explicitly from said user, of one or more categories in which said user is interest;
      a third indication, received explicitly from said user, of one or more concepts in which said user is interested; and
      a duration of time within which a site is to have been updated in order to be selected by said server, wherein said server omits, from said one or more content items:
         those items located on web sites that do not provide feeds;
         those items located on web sites that have not been updated within said duration of time;
         those items outside of categories specified by said second indication; and
         those items unrelated to concepts specified by said third indication; and
   communicating an identification of said one or more content items to said user, said identification of said one or more content items including a fourth indication of which content items have been explicitly indicated by said user in said first indication.

27. The method of claim 26, wherein said toolbar has a learning mode that can be turned on and off at election of the user, wherein said toolbar recurrently uploads new events in said browsing history to said server when said learning mode is turned on, and wherein said toolbar does not upload new events in said browsing history to said server when said learning mode is turned off.

* * * * *